(No Model.) 2 Sheets—Sheet 2.
E. BAZIN.
ROTARY ELECTRIC BATTERY.
No. 316,437. Patented Apr. 28, 1885.
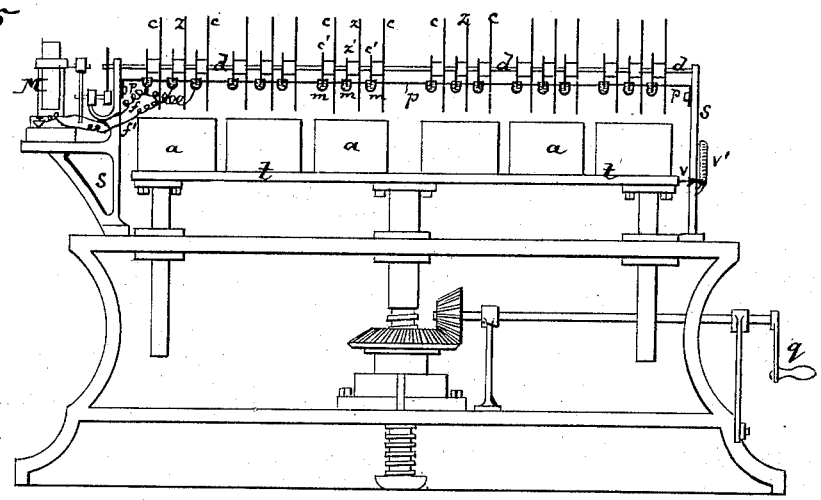
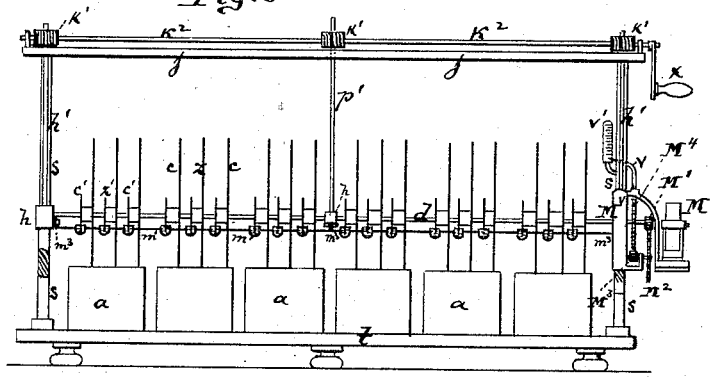
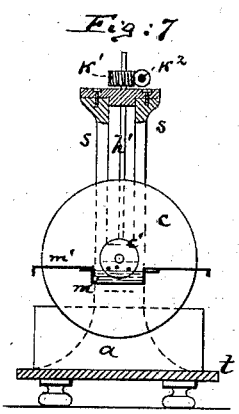
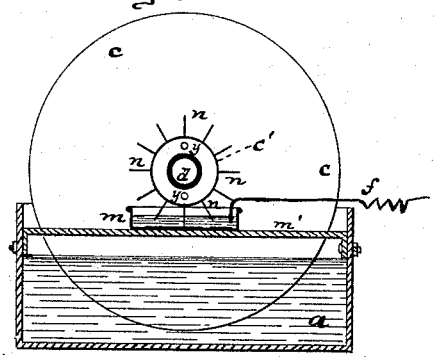
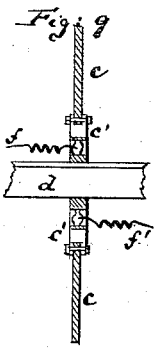
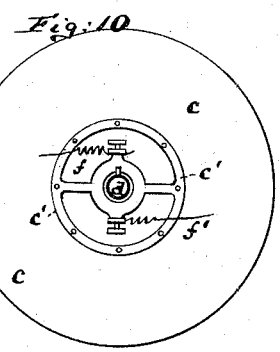
Witnesses:
Gustav Schneppé
John M. Speer
Inventor
Ernest Bazin
by his attorneys
Briesen & Steele

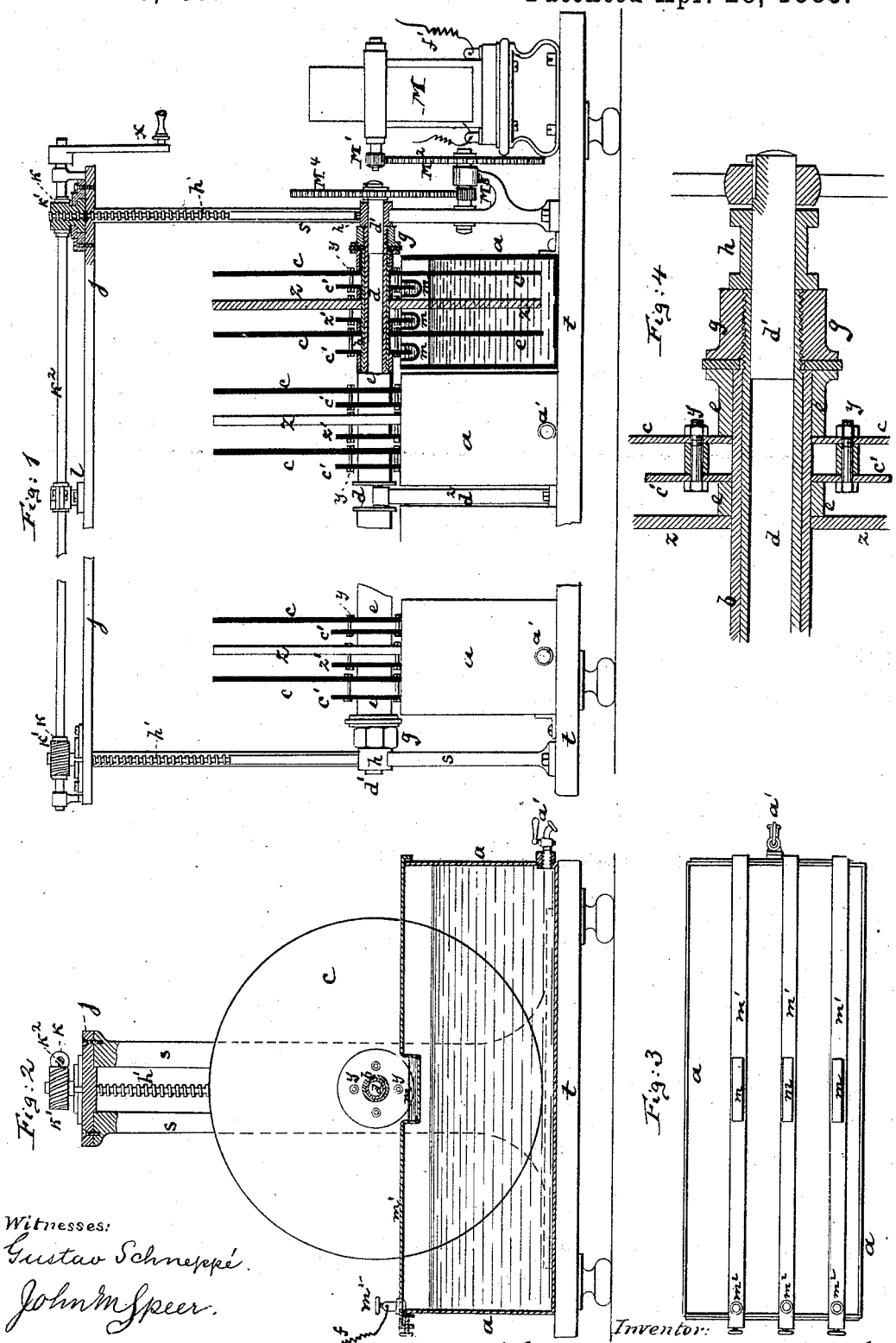

UNITED STATES PATENT OFFICE.

ERNEST BAZIN, OF PARIS, FRANCE.

ROTARY ELECTRIC BATTERY.

SPECIFICATION forming part of Letters Patent No. 316,437, dated April 28, 1885.

Application filed October 17, 1884. (No model.) Patented in France September 19, 1884, No. 164,391, and in Belgium September 26, 1884, No. 66,420.

*To all whom it may concern:*

Be it known that I, ERNEST BAZIN, a citizen of France, residing at Paris, in the French Republic, have invented new and useful Improvements in Rotary Electric Batteries, (for which I have obtained a patent in France, dated September 19, 1884, No. 164,391, and also in Belgium, dated September 26, 1884, No. 66,420,) of which the following is a specification.

My invention relates to that class of battery in which the electrodes or the zinc and carbon elements or other active and conducting matters are in the form of disks, to which a rotary motion is imparted for preventing the adhesion of hydrogen globules on the said electrodes, such adherence causing polarization, the rotary motion of the disks in conjunction with their exit from the bath into the air and their return to the bath being the means of conveying with them to the bath a certain quantity of oxygen, thus lengthening the duration of such batteries.

As a characteristic feature of this invention, and for which claim is hereinafter made, is the method of collecting the current necessary for the action of the battery or batteries with rotating disks or electrodes, such collection being effected without loss, as if the contacts were fixed, (*vide* the two arrangements shown in the accompanying drawings by Figures 5, 6, and 7,) whose object is the complete or partial removal either of the active matters and conductors, or of the recipients containing the liquid. Claim is also made to the other improvements described in the specification and illustrated by the drawings, which, although less important, constitute a whole and complete union of parts, the application of which to rotary batteries produces novel, excellent, and practical results in electricity.

Description: The accompanying drawings show, by Fig. 1, a side elevation of a rotary battery, partly in section and composed of a number of similar elements. Fig. 2 is a vertical section through one of the current-entries. Fig. 3 is a plan of Fig. 2, the electrode-disks removed. Fig. 4 is an enlarged longitudinal section of part of the mechanism. Figs. 5 to 10, inclusive, show modifications, hereinafter more fully described. All the elements are composed in the manner shown in section to the right of Fig. 1.

In a bath or trough of wood or ebonite, $a$, the two disks $c$ $c$ of carbon are plunged, and between each is the zinc disk $z$. Each three are solid, respectively, with the concentric collars $c'$ $c'$ $z'$, from which they are separated by four tie-pieces, $y$, which, being good conductors of electricity, keep them in constant communication. The disks $c$ $c$ and $z$, with their collars, are adjusted on a long insulating cylinder, $b$, surrounding the tubular shaft $d$. Each disk is separated from its neighboring collar by a ring, $e$, of non-conducting material. (See Fig. 4.) All the rings $e$ are kept secure between the disks and collars which they are intended to insulate by screwing the two nuts $g$ $g$ on the threaded ends of the hollow shaft $d$, which receives at its two ends the two journals $d'$ $d'$, which turn in the bearings $h$ of the supports $s$ $s$, between which the elements of the battery are arranged, resting like them on a table, $t$. In the center or at several points judiciously selected the shaft $d$ of the disks is borne by supports $d^2$, at the summit of which the hollow shaft $d$ turns.

The bearings $h$ are movable according as it is desired to plunge the disks into the exciting-liquid or to withdraw them therefrom, according to whether the battery is in use or not. With this object it suffices to set the crank $x$ in motion by means of an endless screw, $k$, and helical or worm wheels $k'$, forming screws to the threaded shafts $h'$ $h'$ for producing a rectilinear lifting and lowering movement of the bearings $h$ $h$, to which are connected the shafts $h'$ $h'$.

The supports $s$ $s$ are tied above by the cross-bar $j$, in the center of which an intermediate cushion, $l$, is placed for supporting the shaft $k^2$ of the endless screw $k$.

It has been stated that the zinc and carbon electrodes plunge into the exciting-fluid in the recipient or trough $a$, each one of which receiving the effects of the decomposition of the battery the electric current is produced and is collected by the following and novel method, whose essential characteristic is the avoidance of all discontinuity and consequent loss.

Each of the collars $c'$ $c'$ $z'$ of the carbons and zincs revolves in a mercury bath, $m$, borne by a bar, $m'$, forming a support to the transverse divisions of the trough $a$. These bars are supplied with terminals or binding-screws $m^2$, from which the conducting-wires $f$ $f'$ start, one from the positive, the other from the negative poles of the elements. The collars $c'$ $c'$ $z'$ being constantly in electrical connection with the disks $c$ $c$ and $z$, the electricity of the latter passes integrally into the mercury baths $m$, and thence to the terminals $m^2$ on the bars $m'$ of the basins or troughs $a$. All these troughs are furnished with an emptying-tap, $a'$.

Action of the battery: The rotation of the zinc and carbon electrodes for the prevention of polarization of the electrodes is effected by an electric motor, M, whose motion is transmitted to the shaft $d$ of the electrodes by the toothed wheels $M'$ $M^2$ $M^3$ $M^4$. The collars $c'$ $c'$ $z'$ turn with the zinc and carbon disks, which plunge into and transmit the current in the mercury baths without loss or discontinuity, as if the contacts were effected on stationary electrodes. The renewal of the electrodes, from whatever cause arising, is rendered extremely simple and rapid by this novel method of collecting the currents.

Fig. 8 shows as a modification that the intermediate collar, $c'$ or $z'$, which returns the electricity of the carbon $c$ or zinc $z$ to the mercury bath can only plunge into this bath by means of the projections or blades $n$, fixed to the collars at equal distances and in sufficient numbers. This mercury bath $m$ can be used separately or be supported on a separate bar, $m'$. In either case the current is then taken by the conductors $f f'$, which are immersed in the mercury.

Figs. 9 and 10 show another modification for taking the current without separate mercury baths for each disk. At each of the collars $c'$ $c'$ $z'$ of the disks $c$ $c$ $z$ are attached the two conducting-wires $f$ $f'$, which run together the length of the driving-shaft and are united at the ends of this shaft to collecting-collars turning in mercury baths, whence the currents are retaken by one or other of the means above mentioned.

The arrangement shown by Figs. 1, 2, and 3 does not admit of varying the immersed surface of the electrodes, nor consequently the delivery of the battery, whether it is intended, for example, for supplying a variable number of burners for lighting purposes, and generally producing electricity in any quantity. Figs. 5, 6, 7 show methods which satisfy these requirements. In Fig. 5 the recipients or troughs $a$ are mounted on a platform, $t$, which can be lifted or lowered, as desired, by means of a crank, $q$, so as to raise or lower the level of the exciting-liquid, and by this means increase, diminish, or cut off the segment of contact of the positive or negative electrodes with the exciting-liquid.

The driving-shaft $d$ of the disks turns in its bearings fixed inwardly in their supports $s$ $s$. On the other hand all the baths of mercury rest on a surface of support $p$, permanently fixed. An index, $v$, follows the rectilinear and vertical displacements of the platform $t$, marking these movements on a graduated scale, $v'$, thus indicating the depth of immersion of the electrodes. In Figs. 6 and 7 it is the driving-shaft $d$ of the electrodes which rises and falls in the manner described and illustrated by Figs. 1, 2, and 3, with the addition to the center of the battery of the movements of an endless screw and helical or worm wheel for simultaneously actuating the shafts $h'$ $p'$ by the shaft $k$. In its displacement it draws along the supports of the mercury baths whose cross-pieces $m'$ are fixed to the traverses or brackets $m^3$, which are connected to the bearings $h$ of the shaft $d$. The support $M^v$, on which the electric motor M is fixed, is also solid with or participates in the displacements of the shaft $d$. There is, therefore, no interruption in the movements of the electrodes while they are being raised or lowered.

The index $v$ is fixed on the frame $M^v$ of the dynamo, and the scale $v'$ is bolted to the frame $s$, as indicated in Fig. 6.

In conclusion, it may be observed that in obtaining from depolarizing and rotary batteries the maximum of effective power by the means herein described several exciting-liquids have been tried. Experience proves that for these particular batteries bichromate of potash is best suited when the electrodes are iron and zinc, and bichromate of lead for those whose negative electrodes are lead. By the use of these exciting-fluids, in conjunction with the novel rotary batteries, the electric quantity and energy are greatly increased.

What I claim, and desire to secure as my invention, is—

1. The combination of rotary iron collars fixed on a transverse shaft supporting electrodes with a mercury bath which connects metallically with a conducting-wire, said collars dipping into said bath, substantially as herein shown and described.

2. The combination of the shaft $d$, carrying the disks $c$ $c$ $z$ and collars $c'$ $c'$ $z'$, with the bearings $h$, vessel $a$, mercury-cups $m$, threaded shafts $h'$ $h'$, worm-wheels $k'$, and screw-shafts $k^2$, substantially as herein shown and described.

3. The shaft $d$, combined with the non-conducting collars $e$, electrodes $c$ $c$ $z$, disks $c'$ $c'$ $z'$, mercury-cups $m$, and bath $a$, substantially as herein shown and described.

4. The combination of the electric motor M with intermediate gearing, shaft $d$, disks $c'$ $c'$ $z'$, electrodes $c$ $c$ $z$, mercury-cups $m$, bath $a$, and conducting-wires $f f'$, as described.

5. The mercury-cups $m$, combined with the metal bars $m'$, having terminals $m^2$, and with the disks $c'$ $c'$ $z'$, insulating-collars $e$, tie-pieces $y$, electrodes $c$ $c$ $z$, shaft $d$, and bath $a$, substantially as herein shown and described.

ERNEST BAZIN.

Witnesses:
ALPHONSE BLÉTRY,
EDWARD P. MACLEAN.